(12) United States Patent
Davis et al.

(10) Patent No.: US 10,641,119 B2
(45) Date of Patent: May 5, 2020

(54) SLIDING SEAL

(71) Applicant: United Technologies Corporation, Farmington, CT (US)

(72) Inventors: Timothy M. Davis, Kennebunk, ME (US); Paul M. Lutjen, Kennebunkport, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 334 days.

(21) Appl. No.: 15/843,759

(22) Filed: Dec. 15, 2017

(65) Prior Publication Data

US 2018/0106159 A1    Apr. 19, 2018

Related U.S. Application Data

(62) Division of application No. 14/599,953, filed on Jan. 19, 2015, now Pat. No. 9,845,697.

(51) Int. Cl.
| | |
|---|---|
| *F01D 11/00* | (2006.01) |
| *F01D 25/24* | (2006.01) |
| *F16J 15/08* | (2006.01) |

(52) U.S. Cl.
CPC .......... *F01D 11/005* (2013.01); *F01D 25/246* (2013.01); *F16J 15/0887* (2013.01);
(Continued)

(58) Field of Classification Search
CPC ...... F01D 11/005; F01D 11/00; F01D 11/003; F01D 25/246; F01D 25/00;
(Continued)

(56) References Cited

U.S. PATENT DOCUMENTS

| | | | | |
|---|---|---|---|---|
| 2,703,277 | A * | 3/1955 | Spendelow, Jr. | C22C 19/055 148/427 |
| 4,071,269 | A * | 1/1978 | Halling | F16L 23/04 285/145.2 |
| 4,095,005 | A * | 6/1978 | Kishida | B23K 35/30 384/278 |
| 4,448,449 | A * | 5/1984 | Halling | F16L 23/22 277/616 |
| 6,203,025 | B1 * | 3/2001 | Hayton | F01D 11/005 277/637 |

(Continued)

FOREIGN PATENT DOCUMENTS

| | | |
|---|---|---|
| BE | 511690 A | 5/1951 |
| EP | 0962688 A1 | 12/1999 |

OTHER PUBLICATIONS

European Office Action for Application No. 16 151 910.3; dated Aug. 30, 2018.

(Continued)

*Primary Examiner* — Nathan Cumar
(74) *Attorney, Agent, or Firm* — Cantor Colburn LLP (57) ABSTRACT

The present disclosure relates generally to a sliding seal between two components. The sliding seal includes a seal ring including a radially extending base and an axially-extending leg disposed in a seal cavity between first and second components. A retaining ring having a first leg and a second leg defining a cavity therebetween is disposed with a portion of the base and a portion of the first component contained therein, thereby providing loading forces to help the seal ring seal against both the first and second components. One or more rope seals are carried by the seal ring in an embodiment. Other combinations of seal rings, retaining rings, and rope seals are also disclosed.

17 Claims, 8 Drawing Sheets

FORWARD ⟵⟶ AFT (52) U.S. Cl.
CPC ...... *F05D 2220/32* (2013.01); *F05D 2230/90* (2013.01); *F05D 2240/11* (2013.01); *F05D 2240/55* (2013.01); *F05D 2300/20* (2013.01); *F05D 2300/603* (2013.01); *Y02T 50/672* (2013.01)

(58) Field of Classification Search
CPC ........... F05D 2220/32; F05D 2220/321; F05D 2220/3213; F05D 2220/3215–3219; F05D 2240/55; F05D 2240/10–11; F05D 2230/90; F05D 2230/20–22; F05D 2230/60; F05D 2230/603; F05D 2230/6031–6033; Y02T 50/672; Y02T 50/00; F16J 15/0887
USPC ........ 277/591, 590, 592, 594, 595, 598, 644
See application file for complete search history.

(56) References Cited

U.S. PATENT DOCUMENTS

2003/0098547 A1\* 5/2003 Yamada ............... F16J 15/3472
                                                          277/358
2005/0220611 A1\* 10/2005 Bhate .................... F01D 11/025
                                                          415/173.3
2016/0208632 A1    7/2016 Davis et al.

OTHER PUBLICATIONS

European Search Report and Communication; Application No. EP 16 15 1910; dated Jun. 9, 2016; 7 pages.
European Office Action for Application No. 16 151 910.3; dated Jul. 17, 2019.

\* cited by examiner

SLIDING SEAL

CROSS REFERENCE TO RELATED APPLICATIONS

This application is a divisional of U.S. patent application Ser. No. 14/599,953 filed on Jan. 19, 2015, the contents of which are incorporated herein by reference thereto.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second adjacent components disposed about an axial centerline is disclosed, the seal comprising: a retaining ring including a retaining ring base and first and second substantially radially extending retaining ring legs extending from the retaining ring base and defining a substantially radially extending retaining ring cavity; a seal ring including a substantially radially extending seal ring base and a substantially axially extending seal ring leg extending from the seal ring base, the seal ring base at least partially disposed within the retaining ring cavity; and a substantially radially extending component cavity disposed in the first component and defining a substantially radially extending first component rail, wherein at least a portion of the first retaining ring leg is disposed within the component cavity.

In a further embodiment of the above, the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

In a further embodiment of any of the above, the seal further comprises a coating applied to at least a portion of each of the retaining ring and the seal ring.

In a further embodiment of any of the above, the seal further comprises a sheath covering at least a portion of each of the retaining ring and the seal ring.

In a further embodiment of any of the above, the seal further comprises a rim operatively coupled to the retaining ring base and extending radially outward therefrom.

In a further embodiment of any of the above, the retaining ring and the seal ring are both split at one respective circumferential location thereof.

In a further embodiment of any of the above, the seal further comprises a bridging seal disposed adjacent the first and second seal sections and at least partially covering the split locations.

In a further embodiment of any of the above, the first retaining ring leg seats against the first component rail; the seal ring base seats against the first component; the second retaining ring leg seats against the seal ring; and the seal ring leg seats against the second component.

In a further embodiment of any of the above, the seal further comprises a substantially radially extending rail disposed on the seal ring leg.

In a further embodiment of any of the above, the seal further comprises a plurality of slots formed through the first and second retaining ring legs and disposed adjacent the retaining ring radially inner end.

In a further embodiment of any of the above, the retaining ring is formed from sheet metal.

In a further embodiment of any of the above, the seal further comprises: a first seal ring cavity disposed in the seal ring base; a first rope seal at least partially disposed within the first seal ring cavity; a second seal ring cavity disposed in the seal ring leg; a second rope seal at least partially disposed within the second seal ring cavity.

In another embodiment, a system is disclosed, comprising: a first component including a first surface; a second component including a second surface, the first and second components disposed about an axial centerline, the second component disposed adjacent the first component and defining a seal cavity therebetween; and a seal disposed in the seal cavity, the seal including: a retaining ring including a retaining ring base and first and second substantially radially extending retaining ring legs extending from the retaining ring base and defining a substantially radially extending retaining ring cavity; a seal ring including a substantially radially extending seal ring base and a substantially axially extending seal ring leg extending from the seal ring base, the seal ring base at least partially disposed within the retaining ring cavity; and a substantially radially extending component cavity disposed in the first component and defining a substantially radially extending first component rail, wherein at least a portion of the first retaining ring leg is disposed within the component cavity; wherein pressure within the seal cavity urges the seal to seat against the first surface, the second surface and the first component rail.

In a further embodiment of any of the above, the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

In a further embodiment of any of the above, the seal further comprises a rim operatively coupled to the retaining ring base and extending radially outward therefrom.

In a further embodiment of any of the above, the first retaining ring leg seats against the first component rail; the seal ring base seats against the first component surface; the second retaining ring leg seats against the seal ring; and the seal ring leg seats against the second component surface.

In a further embodiment of any of the above, the seal further comprises a substantially radially extending rail disposed on the seal ring leg.

In a further embodiment of any of the above, the seal further comprises a plurality of slots formed through the first and second retaining ring legs and disposed adjacent the retaining ring radially inner end.

In a further embodiment of any of the above, the seal further comprises: a first seal ring cavity disposed in the seal ring base; a first rope seal at least partially disposed within the first seal ring cavity; a second seal ring cavity disposed in the seal ring leg; and a second rope seal at least partially disposed within the second seal ring cavity.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
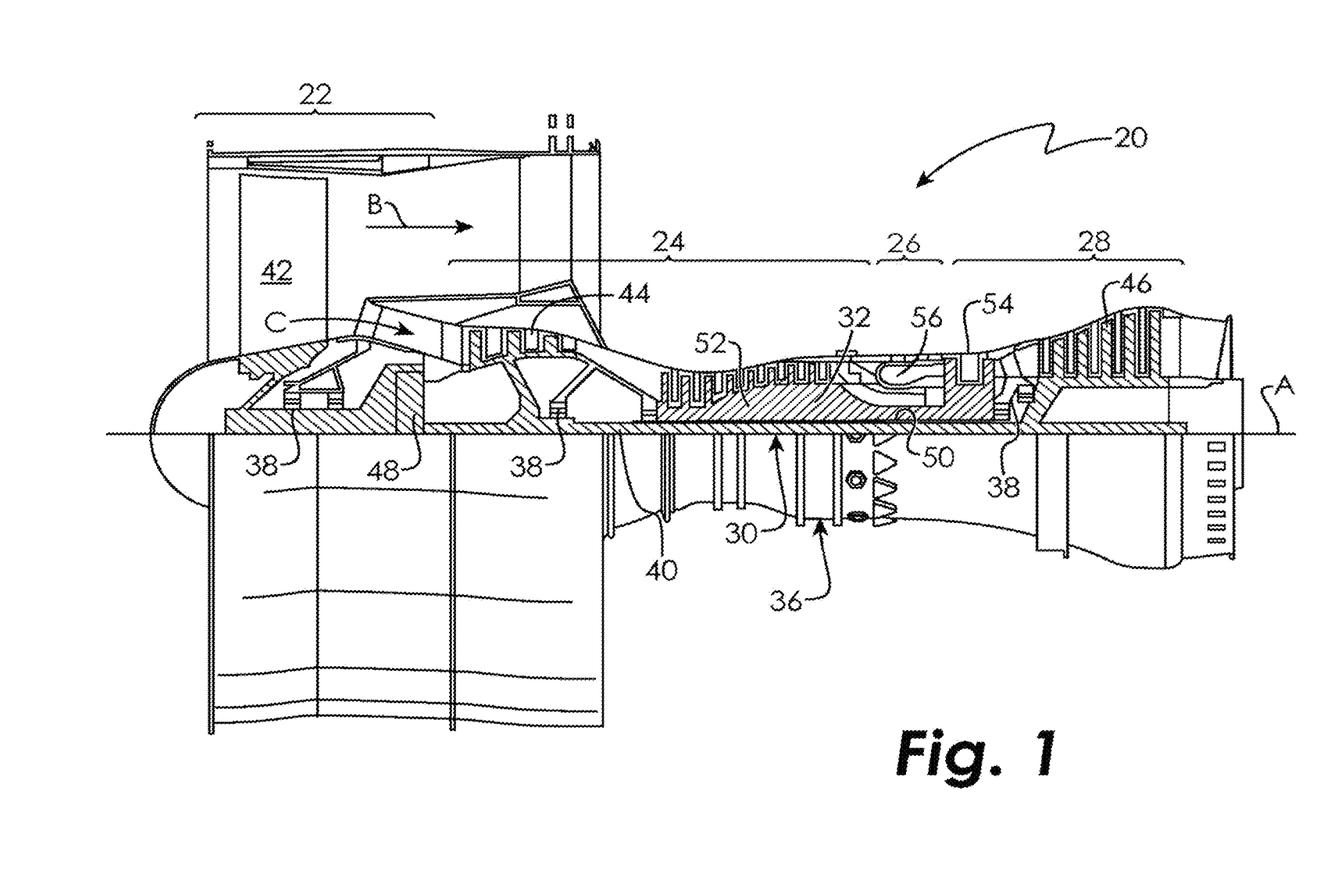
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
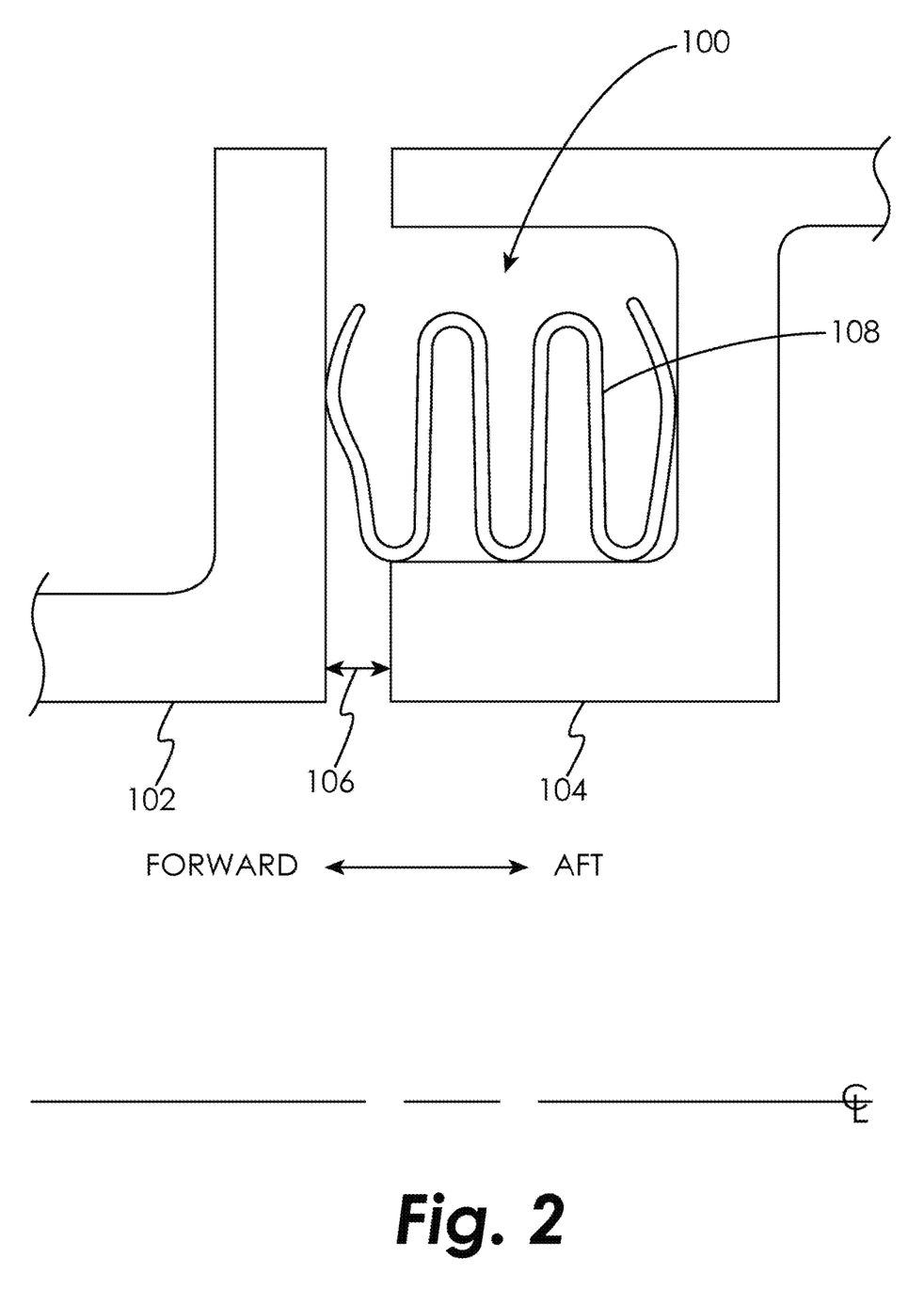
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-portion alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
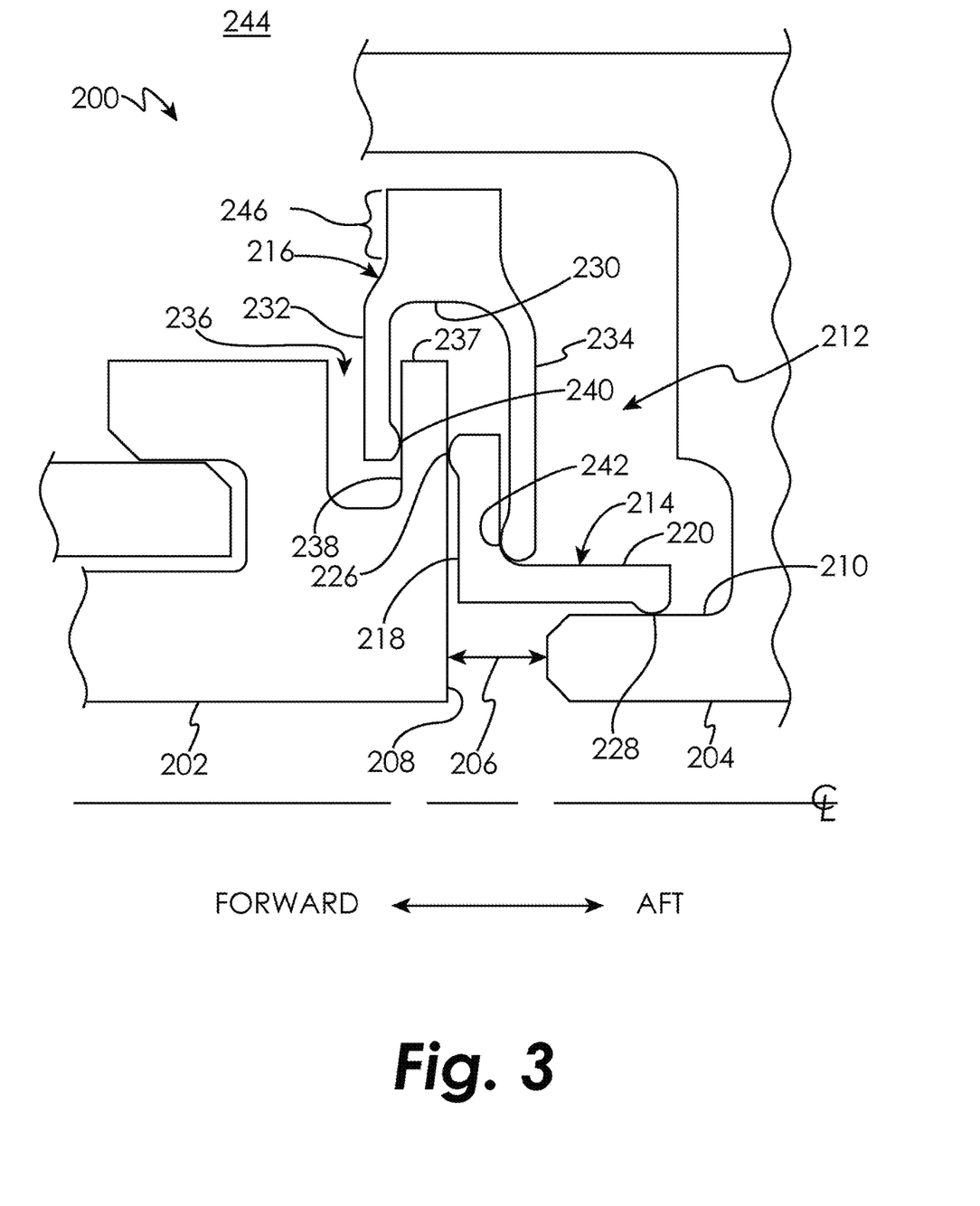
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes a surface 210 facing the seal cavity 200. Within the seal cavity 200 lies a seal assembly 212 formed from a material appropriate to the anticipated operating conditions of the seal assembly 212, such as a high-temperature metal alloy, a high temperature ceramic material, a high temperature ceramic composite, or a combination of two or more of these, to name just a few non-limiting examples. The seal assembly 212 is formed from a seal ring 214 and a retaining ring 216. The seal ring 214 is generally L-shaped and includes a substantially radially extending base 218 and a substantially axially extending leg 220. As used herein, the term "substantially radially extending" is intended to mean only that the portion extends more radially than axially. Similarly, the term "substantially axially extending" is intended to mean only that the portion extends more axially than radially. The seal assembly 212 may include a coating and/or a sheath to provide increased wear resistance.

The base 218 may include a substantially rounded portion 226 in contact with the surface 208 such that the seal ring 214 contacts the surface 208 along a single circumferential line of contact (in the case of full hoop components) or a single partially circumferential line of contact (in the case of split hoop components). As used herein, the phrases "circumferential line of contact" and "partially circumferential line of contact" include lines with a nominal radial or axial thickness. The seal ring 214 also may also include a substantially rounded end 228 in contact with the surface 210 such that the seal ring 214 contacts the surface 210 along a single circumferential line of contact (in the case of full hoop components) or a single partially circumferential line of contact (in the case of split hoop components). In some embodiments, the seal ring 214 does not include one or both of the substantially rounded portions 226 and 228.

The retaining ring 216 includes a base 230 and two radially inward extending legs 232, 234. The component 202 includes a substantially radially extending cavity 236 formed therein and defining a radial rail 237 having a surface 238. The retaining ring 216 leg 232 may include a substantially rounded portion 240 in contact with the surface 238 such that the retaining ring 216 leg 232 contacts the surface 238 along a single circumferential line of contact (in the case of full hoop components) or a single partially circumferential line of contact (in the case of split hoop components). The retaining ring 216 leg 234 may include a substantially rounded portion 242 in contact with the seal ring 214 base 218 such that the retaining ring 216 leg 234 contacts the seal ring 214 base 218 along a single circumferential line of contact (in the case of full hoop components) or a single partially circumferential line of contact (in the case of split hoop components). In some embodiments, the retaining ring 216 does not include one or both of the substantially rounded portions 240 and 242. The base 230 may include a rim 246 that extends radially outward from the legs 232, 234 of the retaining ring 216 in an embodiment.

Figure 4:
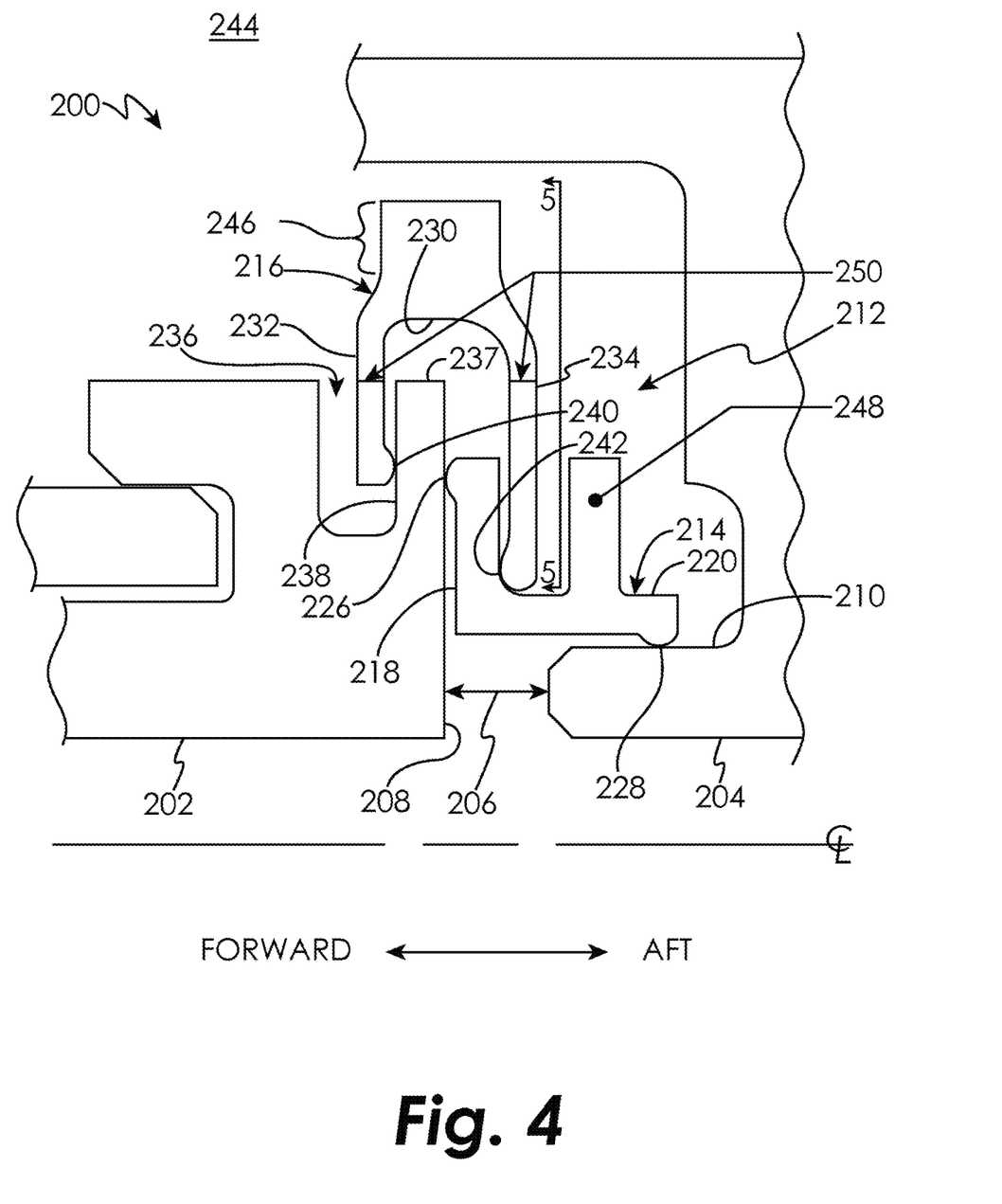
FIG. 4 is a schematic cross-sectional view of a seal and seal cavity in an embodiment.
Figure 5:
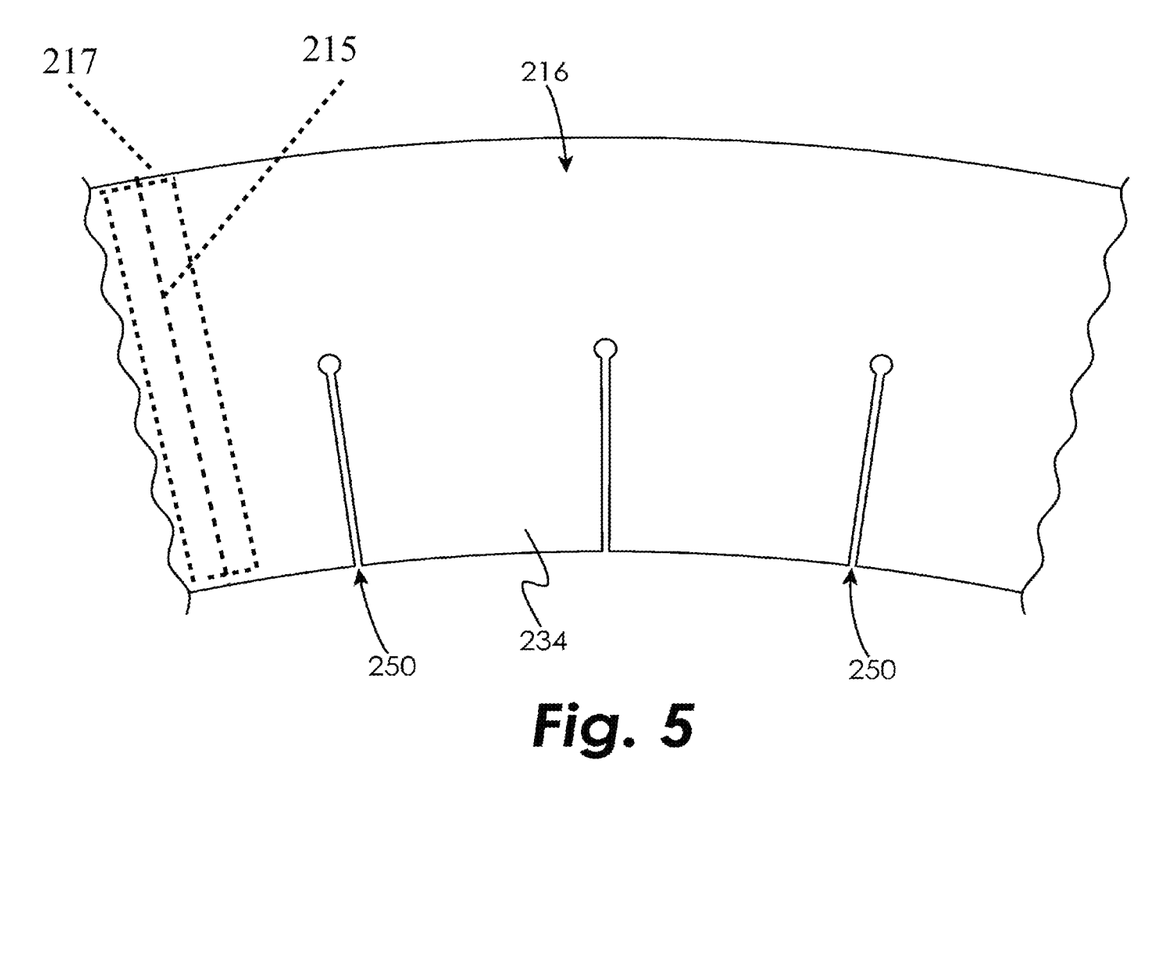
FIG. 5 is a schematic elevational view of a seal in an embodiment.

In an embodiment, a stiffening radial rail 248 may be added to the seal ring 214 leg 220, as shown in FIG. 4, to help resist rolling and/or enable additional radial preload of the seal ring 214 against the surface 210 of the component 204. In some embodiments, the legs 232, 234 of the retaining ring 216 may be slotted radially (e.g., slots 250 in FIG. 5) to provide additional flexibility.

Seal ring 214 may be split at one circumferential location to enable pressure to load the seal ring 214 radially inward against the component 204 and to remain in radial sealing contact with the component 204 as thermal effects cause the two parts to grow and move relative to one another. The retaining ring 216 may also be split at one circumferential location 215 (illustrated by the dashed lines in FIG. 5) to allow the retaining ring 216 to be assembled over the radial rails 237, 248 of both the component 202 and the seal ring 214. The retaining ring 216 may be manufactured at a smaller free-state diameter than its installed diameter so that it loads inboard against the seal ring 214, further helping the seal ring 214 to remain in contact with the surface 210 of the component 204. The rim 246 extending radially outward from the legs 232, 234 of the retaining ring 216 in an embodiment provides additional mass at the radially outer diameter of the retaining ring 216, thereby adding radial stiffness which enables higher inward radial preload to be imparted onto surfaces 220 and 210. The retaining ring 216 also loads the seal ring 214 forward against the component 202 surface 208 by forming the legs 232, 234 to have an axial distance therebetween such that they must axially flex when being installed over the component 202 and the seal ring 214. This causes the seal ring 214 to remain in sealing contact with the surface 208 of the component 202. Leakage can be reduced at the split location of the seal ring 214 and the retaining ring 216 by off-setting one split relative to the other, and further reduced by adding a sliding bridge to cover the gap in one or both of the seal ring 214 and retaining ring 216.

Figure 6:
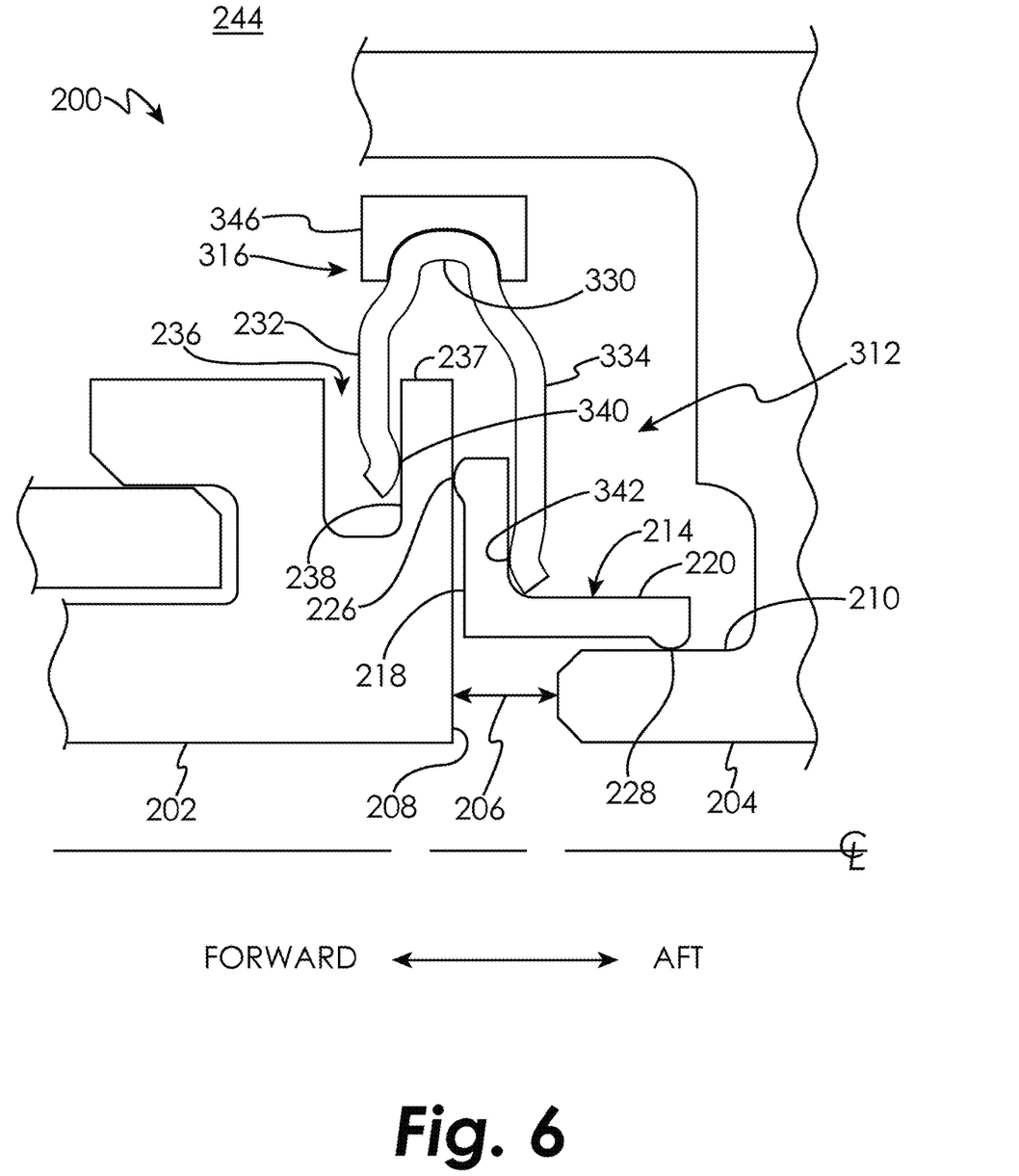
FIG. 6 is a schematic cross-sectional view of a seal and seal cavity in an embodiment.

In the embodiment illustrated in FIG. 6, a retaining ring 316 is used with the seal ring 214. The retaining ring 316 includes a base 330 and two radially inward extending legs 332, 334. The retaining ring 316 leg 332 may include a substantially rounded portion 340 in contact with the surface 238 such that the retaining ring 316 leg 332 contacts the surface 238 along a single circumferential line of contact (in the case of full hoop components) or a single partially circumferential line of contact (in the case of split hoop components). The retaining ring 316 leg 334 may include a substantially rounded portion 342 in contact with the seal ring 214 base 218 such that the retaining ring 316 leg 334 contacts the seal ring 214 base 218 along a single circumferential line of contact (in the case of full hoop components) or a single partially circumferential line of contact (in the case of split hoop components). In some embodiments, the retaining ring 316 does not include one or both of the substantially rounded portions 340 and 342. A radially outward rim 346 may be disposed adjacent to the base 330 to provide functionality analogous to the rim 246. The retaining ring 316 may be split at one circumferential location. Because of the design of the retaining ring 316, it may be formed from sheet metal, which may be less expensive than other embodiments.

Figure 7:
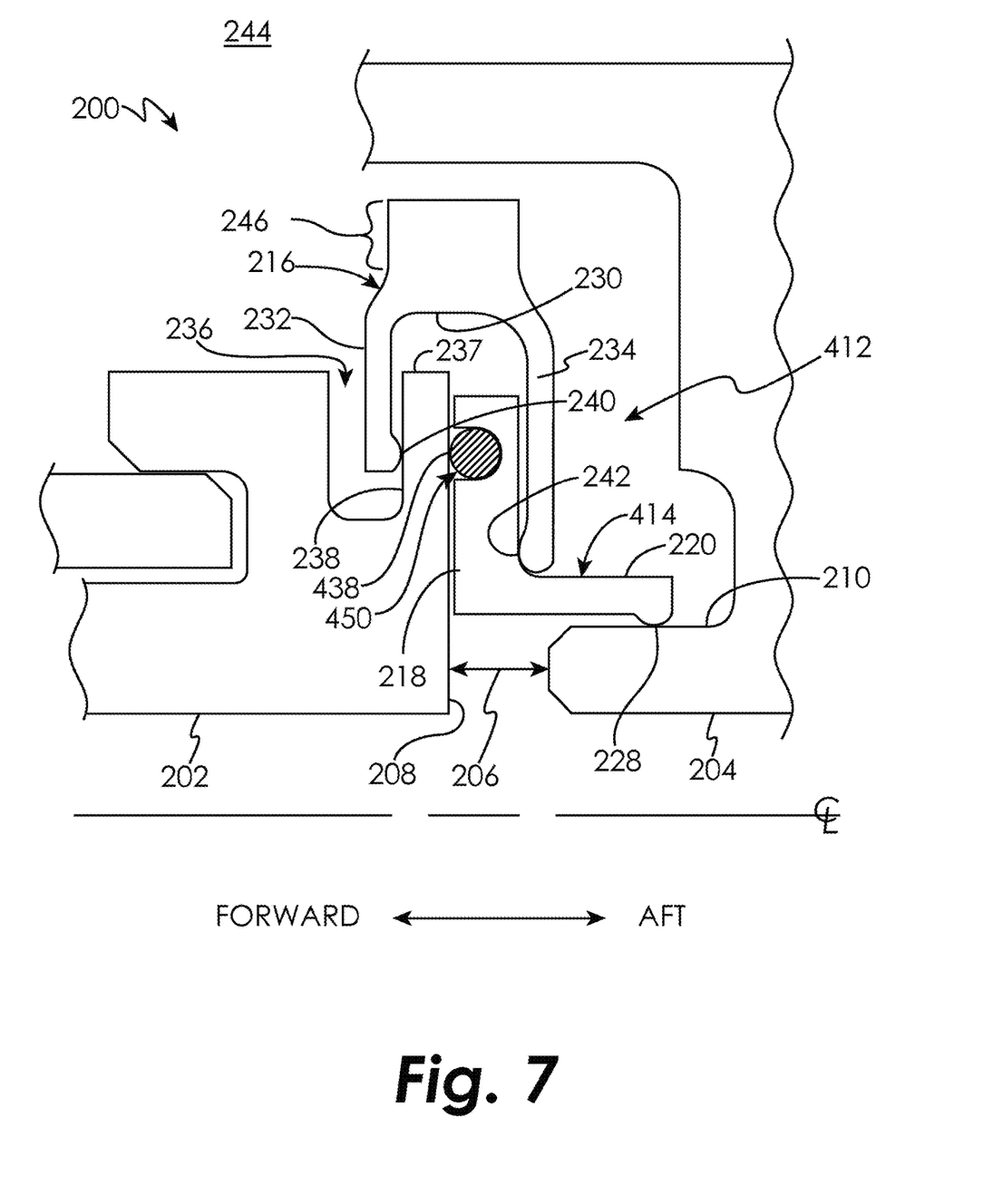
FIG. 7 is a schematic cross-sectional view of a seal and seal cavity in an embodiment.
Figure 8:
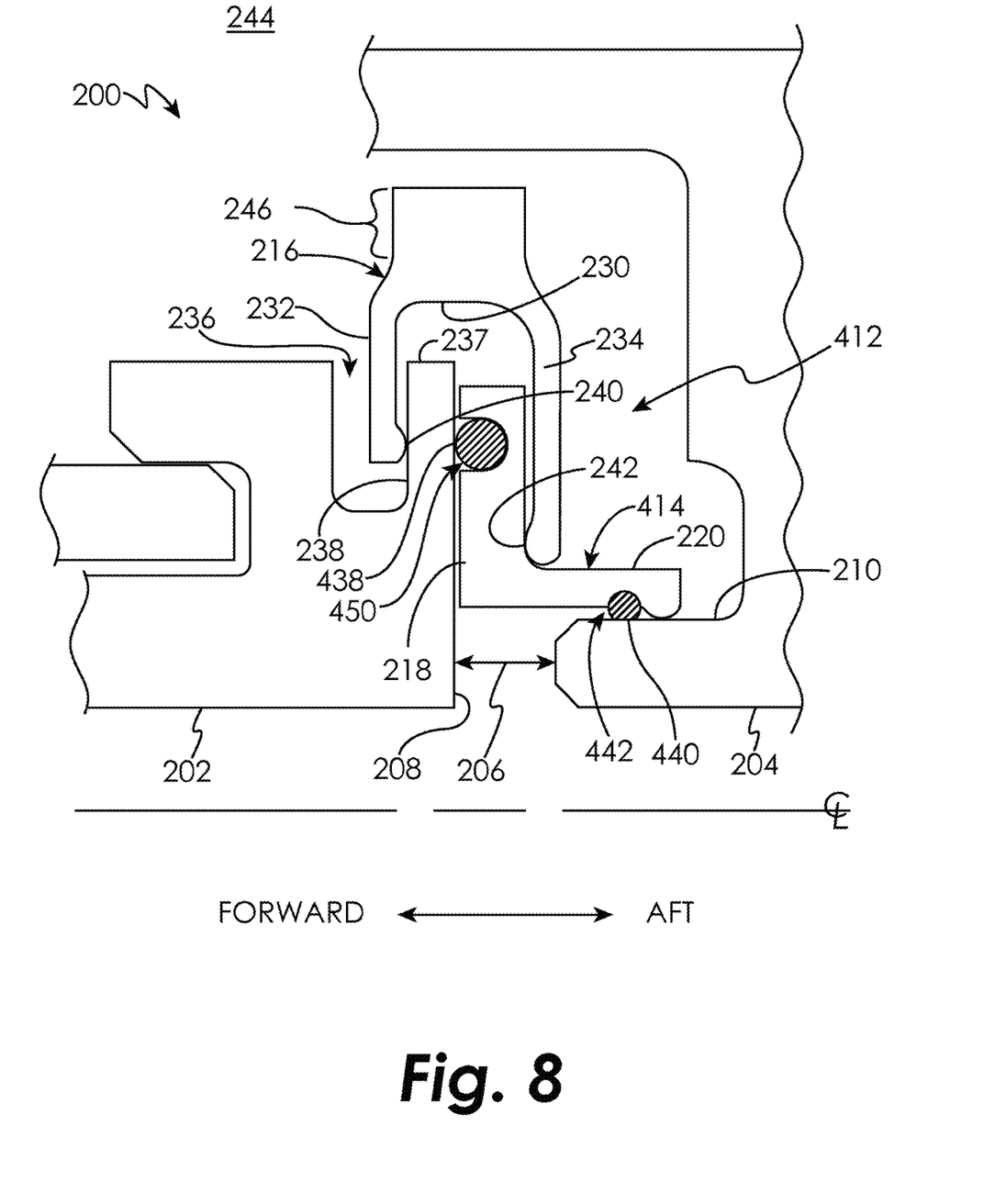
FIG. 8 is a schematic cross-sectional view of a seal and seal cavity in an embodiment.

In the embodiment illustrated in FIG. 7, a rope seal 438 is disposed within a cavity 450 formed into a forward surface of the base 218 of the seal ring 414. The rope seal 438 may improve conformance and/or sealing of the seal ring 414 against the surface 208 of the component 202. The rope seal 438 is almost entirely contained within the seal assembly 212, thereby minimizing the risk of liberation of the rope seal 438. In the embodiment illustrated in FIG. 8, a rope seal 440 is disposed within a cavity 442 formed into a radially inward surface of the leg 220 of the seal ring 414. The rope seal 440 may improve conformance and/or sealing of the seal ring 414 against the surface 210 of the component 204.

Pressure in a secondary flow cavity 244 is transmitted to the seal cavity 200 through an opening defined by the components 202, 204. This pressure acts upon the surfaces of the seal ring 214, thereby causing the base 218 to seat against the surface 208 of the component 202 and the leg 220 to seat against the surface 210 of the component 204. The sliding seal ring 214, 414 is therefore pressure energized during engine operation to load axially forward and radially inward against the two sealing surfaces 208, 210, while the retaining ring 216, 316 serves to apply additional loading. This prevents most or all of the secondary flow cavity 244 gases from reaching the design clearance 206 area and flow path. As the two components 202 and 204 move relative to each other in the axial and/or radial direction, the seal ring 214/414 is free to slide in the axial and circumferential directions while the retaining ring 216/316 and the pressure forces acting upon the surfaces of the seal ring 214/414 load the seal assembly 212/312/412 so that it remains in contact with both components 202 and 204 as shown. Therefore, sealing is maintained while the components 202 and 204 and the components of the seal assembly 212/312/412 move relative to one another. Because the seal ring 214/414 and retaining ring 216/316 slide with respect to one another and with respect to the components 202, 204, the seal assembly 212/312/412 is not substantially deflected by the relative movement between the components 202 and 204. Additionally, the retaining ring 216, 316 also provides axially forward and radially inward loading when the engine is not in operation, which ensures: a) the seal assembly 212/312/412 is immediately pressure-energized at engine start up, and b) the seal assembly 212/312/412 is held tight against the components 202, 204 during transportation of the engine to preclude damage to the seal assembly 212/312/412.

The retaining ring 216/316 provides a radially inward load and an axially forward load, but it is not subjected to deflection associated with thermal/mechanical expansion and contraction of the seal cavity 200. A very active seal cavity 200 may prevent the use of a wave spring 108 or other loading feature/method (due to over-deflecting/over-stressing the component), whereas the retainer ring 216/316 is insensitive to (i.e. not structurally challenged by) change in the size of seal cavity 200. Therefore, using the retainer ring 216/316 in combination with the sliding seal ring 214/414 achieves a robust seal that won't appreciably deteriorate over time despite subjection to a very challenging environment (e.g., high temperature, very axially/radially active seal cavity, and very limited/small/compact design space). The seal ring 214/414 is not deflected as the components 202 and 204 move relative to each other during engine assembly and engine operation, which is beneficial because the seal ring 214/414 can be made from a lower strength and thicker, more lubricious sheet material that may be lower cost, have higher temperature capability, be more manufacturable, and/or more wear-resistant. The retaining ring 216/316 can be made from a lower-temperature higher-strength material because it is thermally shielded, although a lower-strength (and potentially lower cost) material is suitable in many embodiments based on the limited deflection that is required of the retaining ring 216/316. Additionally, the seal assembly 212 is less susceptible to distortion or breakage, which can cause leakage of gas past the seal assembly 212 and/or liberation of the seal. Furthermore, the seal assembly 212 exhibits improved vibration tolerance due to its additional thickness and friction damping.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A seal for sealing a space defined by first and second adjacent components disposed about an axial centerline, the seal comprising:
 a retaining ring including a retaining ring base and first and second substantially radially extending retaining ring legs extending from the retaining ring base and defining a substantially radially extending retaining ring cavity;
 a seal ring including a substantially radially extending seal ring base and a substantially axially extending seal ring leg extending from the seal ring base, the seal ring base at least partially disposed within the retaining ring cavity; and
 a substantially radially extending component cavity disposed in the first component and defining a substantially radially extending first component rail, wherein at least a portion of the first retaining ring leg is disposed within the component cavity;

a first seal ring cavity disposed in the seal ring base;
a first rope seal at least partially disposed within the first seal ring cavity;
a second seal ring cavity disposed in the seal ring leg; and
a second rope seal at least partially disposed within the second seal ring cavity.

2. The seal of claim 1, wherein the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

3. The seal of claim 1, further comprising:
a coating applied to at least a portion of each of the retaining ring and the seal ring.

4. The seal of claim 1, further comprising:
a sheath covering at least a portion of each of the retaining ring and the seal ring.

5. The seal of claim 1, further comprising a rim operatively coupled to the retaining ring base and extending radially outward therefrom.

6. The seal of claim 1, wherein the retaining ring and the seal ring are both split at one respective circumferential location thereof.

7. The seal of claim 6, further comprising a bridging seal disposed adjacent the split location of the retaining ring or the seal ring.

8. The seal of claim 1, wherein:
the first retaining ring leg seats against the first component rail;
the seal ring base seats against the first component;
the second retaining ring leg seats against the seal ring; and the seal ring leg seats against the second component.

9. The seal of claim 1, further comprising a substantially radially extending rail disposed on the seal ring leg.

10. The seal of claim 1, further comprising a plurality of slots formed through the first and second retaining ring legs and disposed adjacent the retaining ring radially inner end.

11. The seal of claim 1, wherein the retaining ring is formed from sheet metal.

12. A system, comprising:
a first component including a first surface;
a second component including a second surface, the first and second components disposed about an axial centerline, the second component disposed adjacent the first component and defining a seal cavity therebetween; and
a seal disposed in the seal cavity, the seal including:
a retaining ring including a retaining ring base and first and second substantially radially extending retaining ring legs extending from the retaining ring base and defining a substantially radially extending retaining ring cavity;
a seal ring including a substantially radially extending seal ring base and a substantially axially extending seal ring leg extending from the seal ring base, the seal ring base at least partially disposed within the retaining ring cavity; and
a substantially radially extending component cavity disposed in the first component and defining a substantially radially extending first component rail, wherein at least a portion of the first retaining ring leg is disposed within the component cavity; wherein pressure within the seal cavity urges the seal to seat against the first surface, the second surface and the first component rail; and
a first seal ring cavity disposed in the seal ring base;
a first rope seal at least partially disposed within the first seal ring cavity;
a second seal ring cavity disposed in the seal ring leg;
a second rope seal at least partially disposed within the second seal ring cavity.

13. The seal of claim 12, wherein the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

14. The seal of claim 12, further comprising a rim operatively coupled to the retaining ring base and extending radially outward therefrom.

15. The seal of claim 12, wherein:
the first retaining ring leg seats against the first component rail;
the seal ring base seats against the first component surface;
the second retaining ring leg seats against the seal ring; and
the seal ring leg seats against the second component surface.

16. The seal of claim 12, further comprising a substantially radially extending rail disposed on the seal ring leg.

17. The seal of claim 12, further comprising a plurality of slots formed through the first and second retaining ring legs and disposed adjacent the retaining ring radially inner end.

\* \* \* \* \*